United States Patent [19]
Forgrave

[11] Patent Number: 5,477,928
[45] Date of Patent: Dec. 26, 1995

[54] SOFT TURF WHEEL ADAPTER FOR LAWN MAINTENANCE EQUIPMENT

[76] Inventor: Robert Forgrave, 10925 128th Pl. NE., Kirkland, Wash. 98033

[21] Appl. No.: 237,039

[22] Filed: May 3, 1994

[51] Int. Cl.⁶ ................................................. A01B 33/04
[52] U.S. Cl. ........................ 172/76; 172/259; 56/17.2
[58] Field of Search ........................ 56/17.2; 172/76, 172/78, 238, 259, 318, 327, 328, 416, 675

[56] References Cited

U.S. PATENT DOCUMENTS

| | | | |
|---|---|---|---|
| 2,603,136 | 7/1952 | Thomas | 172/78 |
| 2,657,620 | 11/1953 | Meeks | 172/78 X |
| 2,691,333 | 10/1954 | Shumaker | 172/78 X |
| 2,715,882 | 8/1955 | Overstreet | 111/109 |
| 3,538,987 | 11/1970 | Taylor | 172/78 X |
| 4,126,190 | 11/1978 | Wylie | 172/624 |
| 4,553,607 | 11/1985 | Behn et al. | 172/156 |
| 4,589,252 | 5/1986 | Williams | 56/255 |
| 4,702,323 | 10/1987 | Smit et al. | 172/156 |
| 4,974,683 | 12/1990 | Hanig et al. | 172/156 |
| 5,119,880 | 6/1992 | Zehrung, Jr. et al. | 56/17.2 X |

FOREIGN PATENT DOCUMENTS

| | | | |
|---|---|---|---|
| 206240 | 2/1957 | Australia | 56/17.2 |
| 222822 | 5/1958 | Australia | 56/17.2 |
| 229636 | 1/1959 | Australia | 56/17.2 |
| 230223 | 7/1960 | Australia | 56/17.2 |
| 506888 | 12/1954 | Italy | 172/78 |
| 226458 | 12/1924 | United Kingdom | 56/17.2 |
| 693098 | 6/1953 | United Kingdom | 172/78 |

*Primary Examiner*—Randolph A. Reese
*Assistant Examiner*—Christopher J. Novosad
*Attorney, Agent, or Firm*—Henry S. Miller; Rhodes & Ascolillo

[57] ABSTRACT

The invention provides extension links for lawn maintenance equipment to move the front axle forward and allow oversize wheels to be used, increasing flotation capability for soft soil while maintaining the height adjustability.

3 Claims, 2 Drawing Sheets

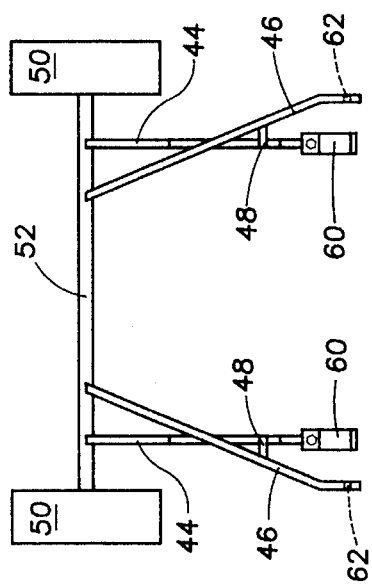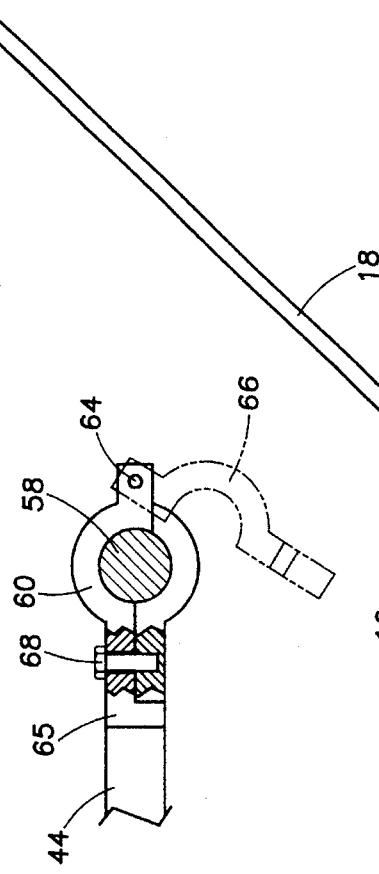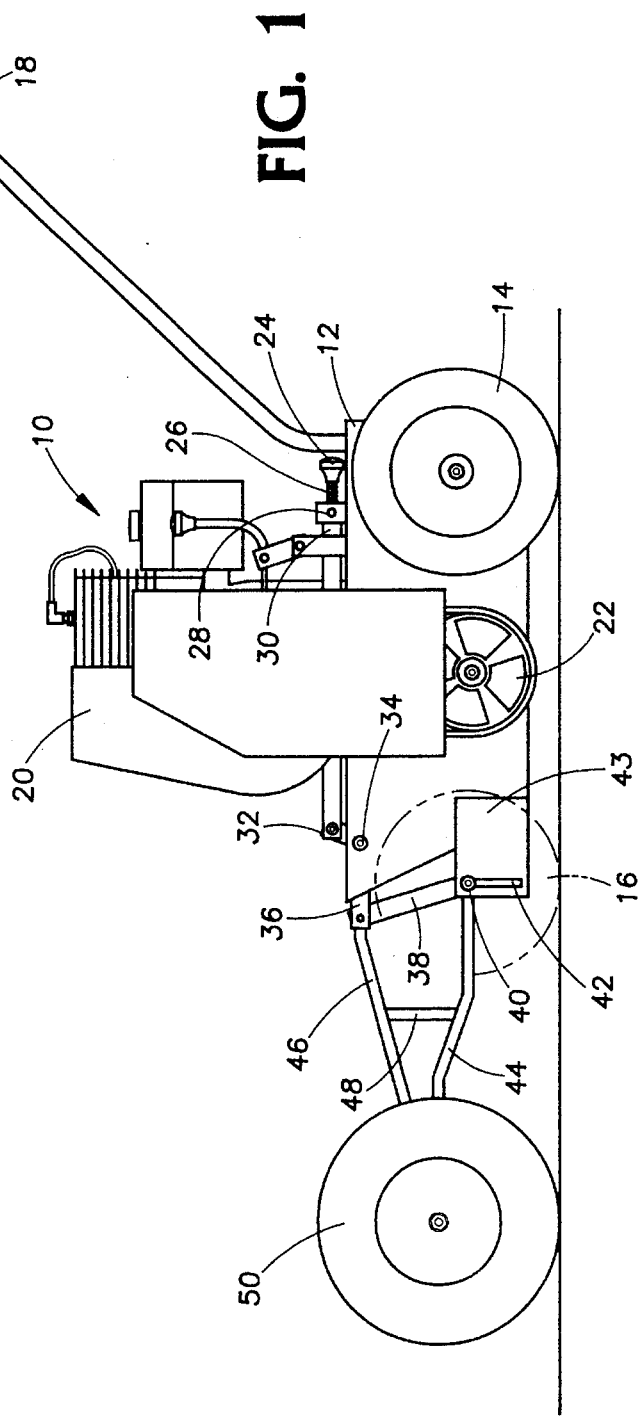

SOFT TURF WHEEL ADAPTER FOR LAWN MAINTENANCE EQUIPMENT

BACKGROUND OF THE INVENTION

1. Field of the Invention

This invention relates generally to lawn maintenance equipment and more particularly to a wheel set for a lawn comb or thatcher.

2. Description of the Prior Art

Early each spring home owners and lawn maintenance workers begin to clear lawns of the debris collected over the winter. Along with this the lawns are generally seeded and fertilized as soon as the ground is stable enough to accept the weight of the equipment used in the process. Due to natural environmental conditions some soils are difficult to stabilize. Wind and sun will dry good draining soil quickly, while cloudy damp weather and poor soil and drainage will delay work schedules.

A piece of equipment used in both the clearing and pre-seeding process is the lawn comb also called the lawn thatcher. The lawn comb consists of a power driven shaft containing a quantity of spring mounted tines that are contained in a housing mounted on adjustable wheels. The housing is rolled across the lawn and the tines loosen prior seasons thatch and leave a small mark of disturbed soil. In the case of a new lawn there would be no thatch and the tines would simply score the soil and make it particularly receptive to the application of grass seed.

The depth of the score mark is important to the successful growth of the seed and depth is regulated by adjustment of the wheels attached to the housing. Under early spring conditions adjustment becomes a problem in that because of the power unit the thatcher is relatively heavy and settles into the soil and varies the adjustment as it travels across the lawn which in turn will vary the growth pattern of the grass.

One solution to the problem is to distribute the weight of the equipment over a larger area by increasing the size of the wheels. Existing equipment, however, is not readily adaptable to simply adding wide wheels. The wheels on equipment currently available are in close proximity to the housing and drive mechanism and do not readily lend themselves to substitution.

U.S. Patents of interest include U.S. Pat. No. 2,715,882 issued Aug. 23, 1955 to Overstreet,Jr. for a grass planting machine with variable depth control. U.S. Pat. Nos. 4,126,190 issued Nov. 21, 1978 to Wylie; 4,553,607 issued Nov. 19, 1985 to Behn et al.; 4,702,323 issued Oct. 27, 1987 to Smit et al., and 4,974,683 issued Dec. 4, 1990 to Hanig et al all disclose tillage attachments to be drawn behind farm tractors but having wheels, linkage systems and adjustability. None of these references it believed to anticipate this invention.

SUMMARY OF THE INVENTION

The invention is an improvement over the prior art and allows the use of the lawn comb thatcher in areas and under conditions that would exclude the use of existing equipment. Through the use of extender links, the forward axle of the thatcher is moved away from the housing and larger, wider wheels are added to distribute the machine's weight. The original wheels are removed and bolts substituted for the axle in the verticle adjustment guide on either side and connect to the lower end of the verticle adjustment links. Extender links are connected to the transverse spacer bar between the verticle adjustment links. Second extender links are connected at the upper end of the verticle adjustment links via pins from the verticle link actuator arms extending through the verticle links on both sides. The extender links connect to a forward axle where the larger wider tires are added.

In operation, the thatcher functions as it would without the extender links, in that adjustment to raise and lower the tines is performed with the same controls and but the degree of accuracy and reliability of the adjustment is greatly improved in soft or muddy soil and turf.

It is therefore an object of the invention to provide a new and improved soft turf wheel adapter for lawn maintenance equipment.

It is another object of the invention to provide a new and improved soft turf wheel adapter that allows accurate and reliable wheel height adjustment in unstable soil.

It is a further object of the invention to provide a new and improved soft turf wheel adapter that is simple to install and remove.

It is still another object of the invention to provide a new and improved soft turf wheel adapter that is of a durable and reliable construction.

It is still a further object of the invention to provide a new and improved soft turf wheel adapter that may be easily and efficiently manufactured and marketed.

These and other advantages, features and objects of the invention will become more apparent from the following description taken in connection with the illustrative embodiment in the accompanying drawings.

DESCRIPTION OF THE DRAWINGS

FIG. 1 is a side elevation view of the lawn comb with the extending links attached.

FIG. 4 is a plan view of the extension links of the invention.

FIG. 5 is a side elevation view, partly in section, of the linkage clamp.

DETAILED DESCRIPTION OF THE DRAWINGS

Figure 2:
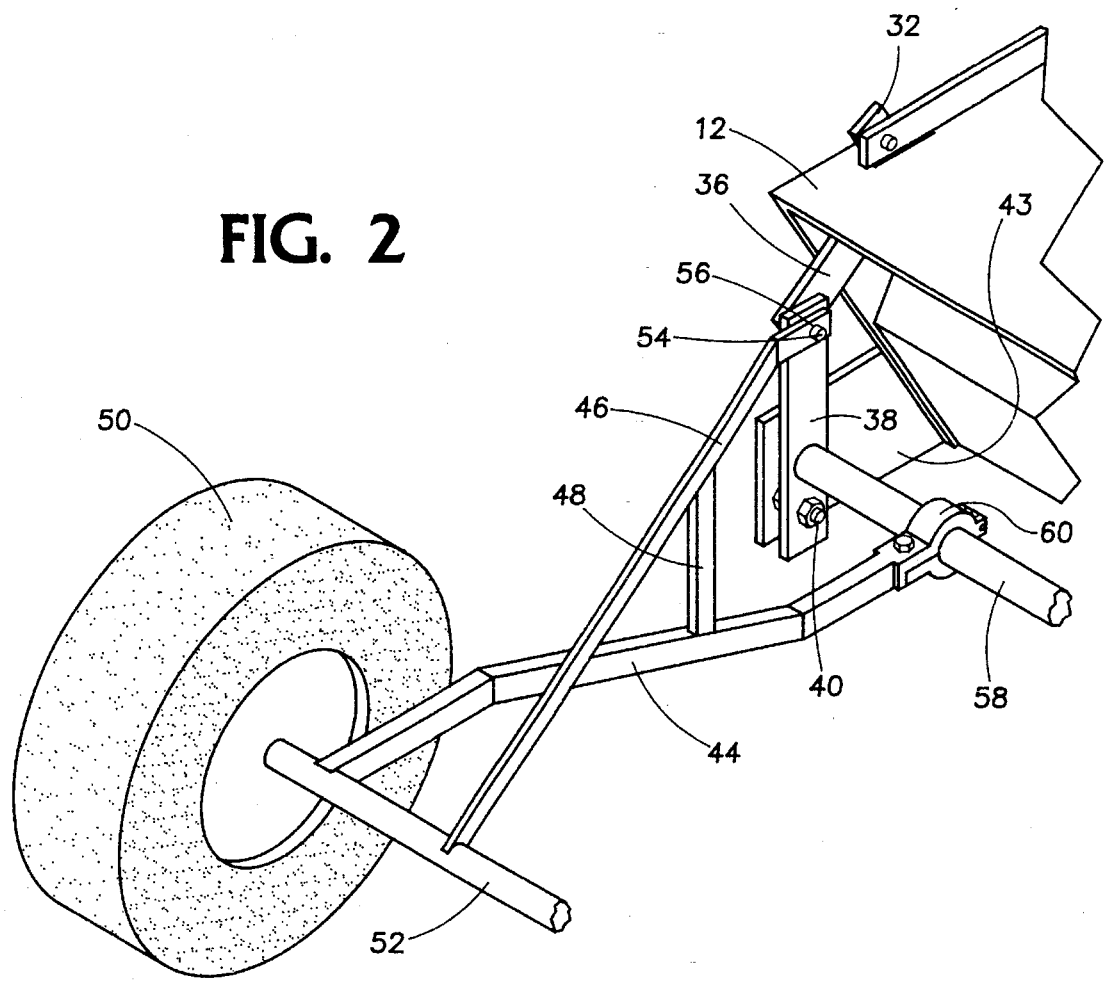
FIG. 2 is a perspective view of one side of the invention attached to the lawn comb.

Referring now to FIG. 1 a typical lawn comb is shown generally at 10. A housing is identified at 12 with wheel 14 mounted near the rear of the housing and a front wheel 16 shown in phantom, as it is removed with the installation of the extender links. The comb is propelled by hand power via handle 18. Gasoline engine 20 mounted on the housing drives the tine shaft, located within the housing, by tine shaft sprocket 22. Height adjustment for the machine is made by an operator turning knob 24 attached to threaded shaft 26 extending through threaded block 28 and rotatably engaging shaft 30. Shaft 30 extends parallel to the housing and engages one arm on bell crank 32 which pivots and rotates shaft 34 with arm 36 engaging verticle link 38. The nut-bolt combination 40 replaces the axle for wheel 16 and rides in verticle guide slot 42 in the housing extender plate 43. Horizontal extender links 44 and 46, reinforced by bar 48 extend forward to the axle and wheel 50.

Concerning FIG. 2 lower link 44 and upper link 46 are shown engaging axle 52. Vertical link pin 54 extends through the vertical link 38 and the upper link 46 and is secured by cotter pin 56. Lower link 44 engages transverse spacer bar 58 by means of clamp 60. Spacer bar 58 is connected at each end to a verticle link whereby changes in the verticle link are translated through the extender links to the axle and wheels.

Figure 3:
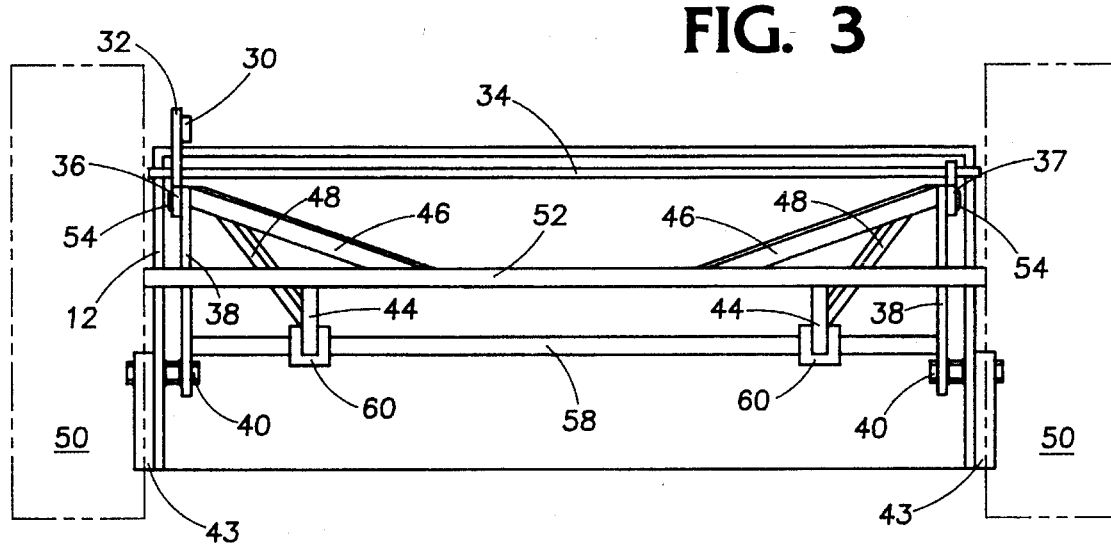
FIG. 3 is a front view of the invention attached to a piece of lawn maintenance equipment.

FIG. 3 shows a front view of the links and their attachment to the lawn comb. The numerals used in the figure are consistent with FIGS. 1 and 2. Shaft 34 is rotatably mounted in the housing 12. At one end, bell crank 32 is fixed to shaft 34 and movement of bell crank arm 36 will cause similar movement in arm 37 connected between the shaft and the verticle link pin 54 mounted on the side opposite from the bell crank. As a result, as the adjustment knob is rotated the vertical links on both sides of the machine are acted upon to raise or lower the wheels.

FIG. 4 is a plan view of the extender links and in particular show the apertures 62 in upper links 46 for engagement with verticle link pin 54.

Clamp 60 is seen in FIG. 5 in its close relation with spacer bar 58. The clamp is hinged at 64 and separates as shown in phantom at 66. A bolt 68 passes through the stationary part of the clamp 65 and threadedly engages the hinged portion thereby tightening it about spacer bar 58.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A soft turf wheel adapter for lawn maintenance equipment, having height adjustment means, comprising:

an axle;

wheel means mounted at each end of the axle;

a first link means affixed to the axle and adapted to engage a transverse bar on lawn maintenance equipment;

said first link means comprises a pair of links;

said first link means is affixed to the axle proximate the wheel means;

said first link means for engaging the transverse bar comprises a clap;

a second link means affixed to the the axle and adapted to engage a height adjustment means on the lawn maintenance equipment, whereby said links will cause the axle and wheel means to be positioned away from the said equipment;

said second link means comprises a pair of links;

said second link means is affixed to the axle intermediate the first link means; and activation of the height adjustment means on the equipment will cause the first and second link means to raise and lower the wheel means resulting in a height adjustment to the equipment.

2. A soft turf wheel adapter for lawn maintenance equipment, having height adjustment means, comprising:

an axle;

wheel means mounted at each end of the axle;

a first link means affixed to the axle and adapted to engage a transverse bar on lawn maintenance equipment;

said first link means comprises a pair of links;

said first link means is affixed to the axle proximate the wheel means;

said first link means for engaging the transverse bar comprises a clamp;

said clamp is secured by a single threaded bolt;

a second link means affixed to the axle and adapted to engage a height adjustment means on the lawn maintenance equipment, whereby said links will cause the axle and wheel means to be positioned away from the said equipment;

said second link means comprises a pair of links;

said second link means is affixed to the axle intermediate the first link means;

the second link means for engaging the height adjustment means comprises an aperture adapted to engage a post on the equipment and a pin to secure the link thereto; and activation of the height adjustment means on the equipment will cause the first and second link means to raise and lower the wheel means resulting in a height adjustment to the equipment.

3. A soft turf wheel adapter for lawn maintenance equipment, having height adjustment means, comprising:

an axle;

wheel means mounted at each end of the axle;

a first link means affixed to the axle and adapted to engage a transverse bar on lawn maintenance equipment;

said first link means comprises a pair of links;

said first link means is affixed to the axle proximate the wheel means;

said first link means for engaging the transverse bar comprises a clamp;

said clamp is secured by a single threaded bolt;

a second link means affixed to the axle and adapted to engage a height adjustment means on the lawn maintenance equipment, whereby said links will cause the axle and wheel means to be positioned away from the said equipment;

said second link means comprises a pair of links;

said second link means is affixed to the axle intermediate the first link means;

the second link means for engaging the height adjustment means comprises an aperture adapted to engage a post on the equipment and a pin to secure the link thereto;

brace means affixed to each first and second link means for reinforcing the said links; and activation of the height adjustment means on the equipment will cause the first and second link means to raise and lower the wheel means resulting in a height adjustment to the equipment.

* * * * *